Patented July 26, 1932

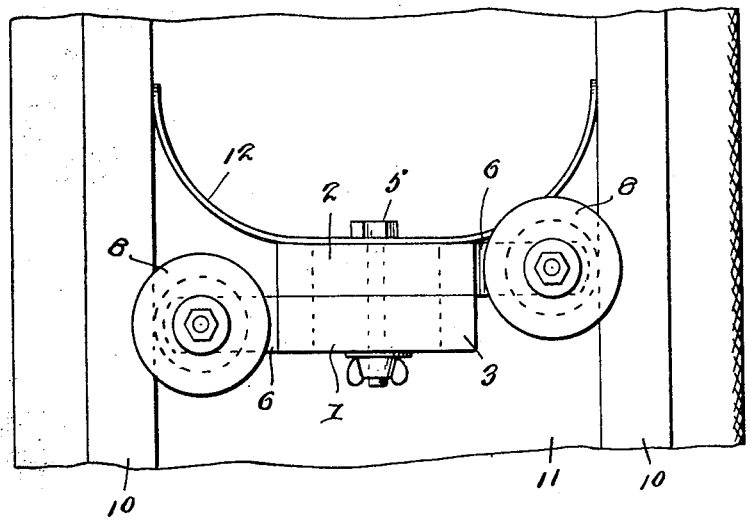
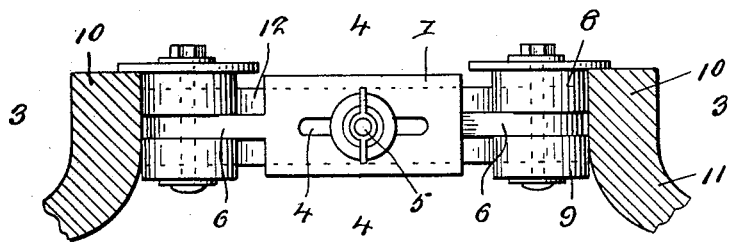
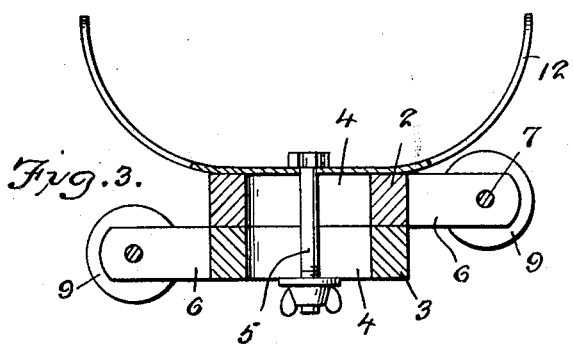
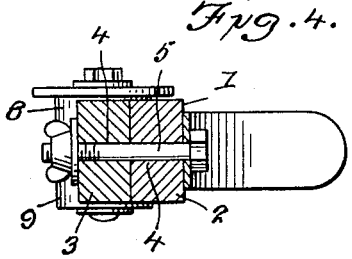

1,868,564

UNITED STATES PATENT OFFICE

CALVIN C. CLARK, OF VERONA, PENNSYLVANIA, ASSIGNOR OF ONE-HALF TO VIOLA D. BENNETT, OF VERONA, PENNSYLVANIA

TIRE SPREADER

Application filed May 21, 1931. Serial No. 539,053.

This invention relates to tire spreaders especially adapted for forcing the beads of a tire apart so that the interior walls of the tire may be easily inspected for breaks, nails, tacks and the like which may become embedded in the tire and has for the primary object, the provision of a device of the above stated character which may be easily and quickly applied to a tire between and in engagement with the beads thereof, so that a person may move the device along the beads with the least amount of effort and which will impart to the tire a desired spreading action for forcing apart the beads sufficiently to permit a thorough inspection to be made of the interior of the tire.

Another object of this invention is the provision of a tire spreader of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating a tire spreader constructed in accordance with my invention and applied to a fragmentary portion of a tire.

Figure 2 is a side elevation illustrating the spreader applied to the beads of the tire and said beads shown in section.

Figure 3 is a sectional view taken on the line 3—3 of Figure 2.

Figure 4 is a sectional view taken on the line 4—4 of Figure 2.

Referring in detail to the drawing, the numeral 1 indicates the body of the spreader which includes members 2 and 3 provided with aligning slots 4 through which extends a fastener 5 in the form of a headed bolt provided with a wing nut and washer for the purpose of clamping the members 2 and 3 together and to permit adjustment of said members relative to each other when desired.

Arms 6 are formed integral with the members 2 and 3 and extend in opposite directions and carry axles 7 on which are journalled wheels 8 and 9. The wheels 8 are of the flanged type for the purpose of guiding the device on a tire. The wheels 9 are non-flanged and are adapted to bear against the interior walls of the beads 10 of a tire 11.

A substantially U-shaped resilient spreading member 12 is slotted to receive the fastener 5 for adjustably securing the same to the member 2. The free ends of the spreading member 12 are adapted to bear against the inner wall of th beads as shown in Figure 1.

The arms 6 are so located on the members 2 and 3 that the wheels 8 and 9 lie substantially within the plane of the sides of said members.

In operation, the device is positioned between the beads 3 of a tire and the members 2 and 3 adjusted relative to each other to place sufficient pressure on the beads to cause separation thereof and the nut of the fastener adjusted against the washer which retains the members 2 and 3 in their adjusted position. The ends of the spreading member 12 are in engagement with the inner walls of the beads and by moving the device along the beads, the tire will be spread a sufficient distance to permit a person to make a thorough inspection of the interior walls of the tire in the proximity of the device, so that breaks, nails and tacks may be located and removed in the usual way. By having the rollers engaging the beads permits the device to be moved along the side beads with the least expenditure of effort on the part of the operator.

While I have shown and described the preferred embodiment of my invention, it will be understood that minor changes in construction, combination and arrangment of parts may be made without departing from the spirit and scope of this invention, as claimed.

Having thus described my invention, what I claim is:

1. A tire spreader comprising a pair of members adjustably secured together, arms on said members, pairs of rollers journalled to each of said arms to engage the beads of a tire, a guide flange formed on one roller of each pair of said rollers, and a resilient spreading member carried by one of the first named members and engaging the inner faces of the beads of a tire.

2. A tire spreader comprising a pair of members adjustably secured together, antifriction means carried by said members and engaging the beads of a tire, and a substantially U-shaped resilient spreading member carried by one of the first named members and contacting with the inner walls of the beads.

In testimony whereof I affix my signature.

CALVIN C. CLARK.